US009816845B2

(12) United States Patent
Kinzuka et al.

(10) Patent No.: US 9,816,845 B2
(45) Date of Patent: Nov. 14, 2017

(54) BOILER LOAD ANALYSIS APPARATUS

(71) Applicant: MIURA CO., LTD., Ehime (JP)

(72) Inventors: Yoshinori Kinzuka, Ehime (JP); Hideo Furukawa, Ehime (JP); Osamu Higuchi, Ehime (JP)

(73) Assignee: Miura Co., Ltd., Ehime (JP)

( * ) Notice: Subject to any disclaimer, the term of this patent is extended or adjusted under 35 U.S.C. 154(b) by 174 days.

(21) Appl. No.: 14/767,740

(22) PCT Filed: Oct. 28, 2013

(86) PCT No.: PCT/JP2013/079075
§ 371 (c)(1),
(2) Date: Aug. 13, 2015

(87) PCT Pub. No.: WO2014/141523
PCT Pub. Date: Sep. 18, 2014

(65) Prior Publication Data
US 2015/0377664 A1  Dec. 31, 2015

(30) Foreign Application Priority Data
Mar. 13, 2013  (JP) .................................. 2013-050524

(51) Int. Cl.
*G01F 1/56*  (2006.01)
*G01F 1/716*  (2006.01)
(Continued)

(52) U.S. Cl.
CPC ................ *G01F 1/56* (2013.01); *F22B 35/00* (2013.01); *F22B 37/38* (2013.01); *F23N 1/02* (2013.01); *G01F 1/00* (2013.01)

(58) Field of Classification Search
USPC ....................................................... 73/861.08
See application file for complete search history.

(56) References Cited

U.S. PATENT DOCUMENTS

| 4,556,018 A * | 12/1985 | Agata ....................... F01K 1/08 |
| | | 122/35 |
| 7,721,972 B2 * | 5/2010 | Bracken ................... F24H 9/20 |
| | | 236/1 H |

(Continued)

FOREIGN PATENT DOCUMENTS

| JP | 53-92002 | 8/1978 |
| JP | 55-84444 U | 6/1980 |

(Continued)

*Primary Examiner* — Clayton E Laballe
*Assistant Examiner* — Warren K Fenwick
(74) *Attorney, Agent, or Firm* — Muncy, Geissler, Olds & Lowe, P.C.

(57) ABSTRACT

The invention provides a boiler load analysis apparatus that has a simple configuration and achieves highly accurate analysis of a boiler load. A boiler load analysis apparatus (10) includes an opening sensor (15) provided to at least one of a fuel supply line (45) and a combustion air supply line (50) of a boiler (40) and configured to measure an opening degree of at least one of a fuel flow regulating mechanism (47) configured to regulate, with the opening degree, a fuel flow in the fuel supply line (45) and a supplied air flow regulating mechanism (54) configured to regulate, with the opening degree, a supplied air flow in the combustion air supply line (50), and a load analyzer (20) configured to calculate a steam load of the boiler (40) from a measurement value of the opening sensor (15), to analyze the steam load of the boiler (40).

5 Claims, 3 Drawing Sheets

(51) Int. Cl.
  *G01P 5/08* (2006.01)
  *F23N 1/02* (2006.01)
  *F22B 37/38* (2006.01)
  *F22B 35/00* (2006.01)
  *G01F 1/00* (2006.01)

(56) References Cited

U.S. PATENT DOCUMENTS

| | | | | |
|---|---|---|---|---|
| 7,743,670 B2* | 6/2010 | Lee | ............ | G01F 25/0038 |
| | | | | 205/157 |
| 7,747,358 B2* | 6/2010 | Troost | ............ | F24H 9/20 |
| | | | | 700/300 |
| 9,127,835 B2* | 9/2015 | Tanaka | ............ | F22B 37/38 |
| 2006/0214015 A1* | 9/2006 | Furukawa | ............ | F23N 3/047 |
| | | | | 236/11 |
| 2013/0048743 A1* | 2/2013 | Kucera | ............ | F23N 3/085 |
| | | | | 236/1 G |

FOREIGN PATENT DOCUMENTS

| | | |
|---|---|---|
| JP | 60-53717 A | 3/1985 |
| JP | H08159552 A | 6/1996 |
| JP | H10220740 A | 8/1998 |
| JP | 2006-266535 | 10/2006 |
| JP | 2008101842 A | 5/2008 |
| JP | 2010139207 A | 6/2010 |
| JP | 2012-7846 A | 1/2012 |

\* cited by examiner

BOILER LOAD ANALYSIS APPARATUS

TECHNICAL FIELD

The present invention relates to a boiler load analysis apparatus configured to analyze a boiler steam load. The present application claims priority based on Patent Application No. 2013-050524 filed in Japan on Mar. 13, 2013 and the contents thereof are incorporated herein.

BACKGROUND ART

A factory or a building utilizes steam generated by a boiler as heating means or air heating means. Recently increasing interests in energy saving grow demands for optimization of boiler operation status such as variation in steam load.

Such optimization of boiler operation status requires measurement of a boiler steam generation amount. The steam generation amount is measured by a flowmeter, which is relatively expensive and is not commonly provided in an existing boiler.

Patent Literature 1 discloses a boiler steam load analysis apparatus including a combustion air fan tester and a pressure sensor. The combustion air fan tester detects a current value supplied to a drive motor of a combustion air fan configured to feed air into a boiler body. The pressure sensor detects pressure in the boiler body. The boiler steam load analysis apparatus calculates a boiler steam flow from the current value of the drive motor of the combustion air fan and the pressure in the boiler body detected by the pressure sensor.

PRIOR ART DOCUMENT

Patent Document

Patent Document 1: JP 2012-7846 A

SUMMARY OF INVENTION

Problems to be Solved by the Invention

However, variation in electric power consumption of a drive motor of a blower fan is smaller than variation in boiler combustion amount. It is thus difficult to accurately analyze a boiler steam load even when a current value supplied to the drive motor is measured. This problem is particularly notable in a boiler including a damper configured to regulate a supplied air flow.

Capacity of a drive motor of a blower fan is widely varied depending on capacity of a boiler. Measurement of current of the drive motor requires check of the capacity of the drive motor and preliminary selection of an applicable current sensor. A general-purpose current sensor is not always applicable, so that the selection requires time and cost.

The present invention has been made in view of the problems mentioned above, and an object thereof is to provide a boiler load analysis apparatus that has a simple configuration and achieves highly accurate analysis of a boiler load.

Solution to the Problems

In order to achieve the object mentioned above, the present invention provides a boiler load analysis apparatus configured to analyze a steam load of a boiler. The apparatus includes an opening sensor provided to at least one of a fuel supply line and a combustion air supply line of the boiler and configured to measure an opening degree of at least one of a fuel flow regulating mechanism configured to regulate, with the opening degree, a fuel flow in the fuel supply line and a supplied air flow regulating mechanism configured to regulate, with the opening degree, a supplied air flow in the combustion air supply line, and a load analyzer configured to calculate the steam load of the boiler from a measurement value of the opening sensor.

Advantages of the Invention

The boiler load analysis apparatus according to the present invention has a simple configuration and achieves highly accurate analysis of a boiler load.

EMBODIMENTS OF THE INVENTION

First Embodiment

A boiler load analysis apparatus according to the first embodiment of the present invention will now be described with reference to the drawings. The boiler load analysis apparatus according to the present embodiment is installed in an existing boiler that is already provided in a factory or the like and has a flow regulating mechanism configured to regulate a fuel flow or a supplied air flow by means of an opening degree.

Figure 1:
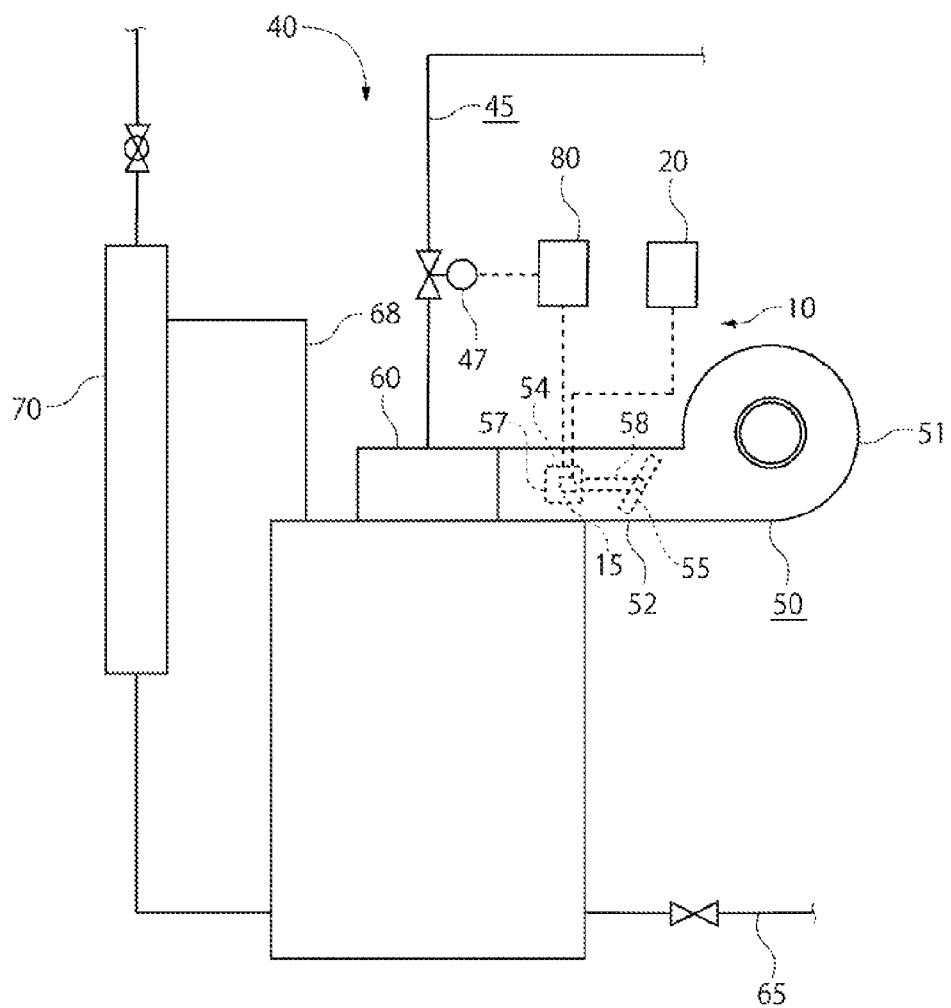
FIG. 1 is a pattern view schematically depicting a configuration of a boiler load analysis apparatus according to a first embodiment of the present invention.
Figure 2:
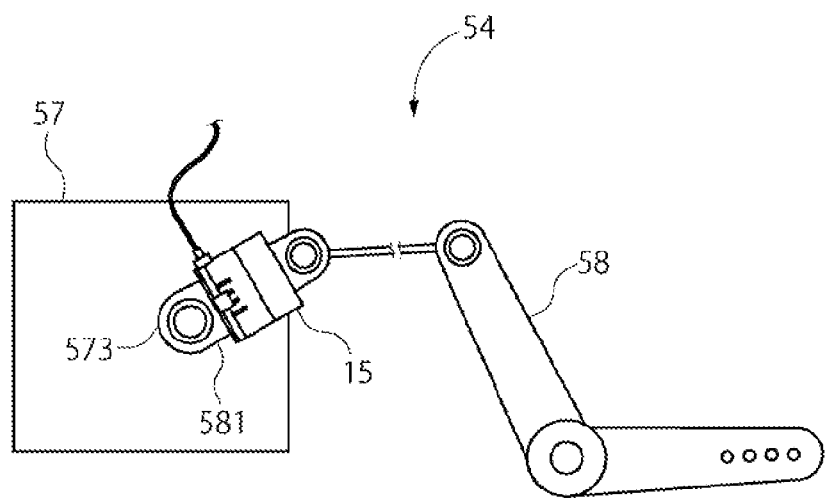
FIG. 2 is a view depicting an installation state of a tilt sensor according to the first embodiment of the present invention.
Figure 3:
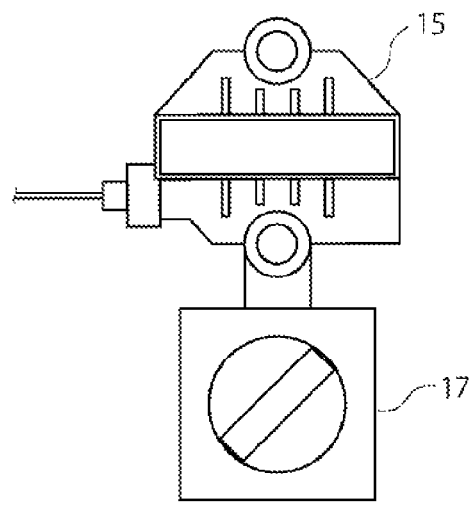
FIG. 3 is a front view of the tilt sensor according to the first embodiment of the present invention.

FIG. 1 is a pattern view schematically depicting a configuration of a boiler load analysis apparatus 10 according to the first embodiment, in a state where the boiler load analysis apparatus 10 is installed in an existing boiler 40. FIG. 2 is a view depicting an installation state of a tilt sensor 15 according to the first embodiment. FIG. 3 is a front view of the tilt sensor 15 according to the first embodiment.

The boiler load analysis apparatus 10 includes the tilt sensor 15 and a load analyzer 20 configured to calculate a steam load of the boiler 40 from output from the tilt sensor 15 and analyze the calculated steam load. The existing boiler 40 is retrofitted with the boiler load analysis apparatus 10. The tilt sensor 15 has a function of linearly outputting variation in tilt angle due to change in posture of the sensor itself, so as to detect a rotation angle of a member fixing the tilt sensor 15.

The boiler 40 includes a fuel supply line 45, a combustion air supply line 50, a burner 60, a feedwater line 65, a steam extraction line 68, a steam-water separator 70, and a controller 80.

The fuel supply line 45 configured to supply the burner 60 with fuel includes a fuel control valve 47 of the proportional control type configured to regulate a fuel flow. The fuel control valve 47 serves as a fuel flow regulating mechanism configured to regulate a fuel flow by means of a valve opening degree.

The combustion air supply line 50 configured to supply the burner 60 with combustion air includes a blower 51, a flow duct 52, and a damper 54 configured to regulate a supplied air flow in the flow duct 52. The damper 54 serves as a supplied air flow regulating mechanism configured to regulate a supplied air flow by means of an opening degree thereof, and includes a damper plate 55 configured to rotate about a damper shaft to vary the opening degree, a modutrol motor 57 serving as a drive motor having a rotation angle regulating function, and a link mechanism 58 configured to transmit drive power of the modutrol motor 57 to the damper plate 55.

The link mechanism 58 is fixed to an output shaft 573 of the modutrol motor 57, and includes an arm 581 configured to rotate about the output shaft 573 integrally with the output shaft 573. Rotation output from the modutrol motor 57 is transmitted to the damper plate 55 via the link mechanism 58, and the damper plate 55 rotates to regulate a supplied air flow in the combustion air supply line 50.

In the boiler 40 thus configured, fuel supply to the burner 60 is regulated by changing the opening degree of the fuel control valve 47 serving as a fuel flow regulating mechanism, and air supply to the burner 60 is regulated by changing the opening degree of the damper 54 serving as a supplied air flow regulating mechanism so as to regulate a combustion amount of the burner 60.

The tilt sensor 15 is an opening sensor fixed to the arm 581 of the link mechanism 58 so as to mechanically measure an opening degree of the damper 54 in the boiler 40, and is configured to measure a rotation angle of the arm 581. As depicted in FIG. 3, the tilt sensor 15 includes a magnet stand 17 that firmly fixes the tilt sensor 15 to the arm 581.

The magnet stand 17 is provided to easily install the tilt sensor 15 in the existing boiler 40 without damaging or dirtying a target facility. The existing boiler 40 can be easily retrofitted with the boiler load analysis apparatus 10 according to the present embodiment so as to facilitate measurement of a steam load. The tilt sensor 15 can be obviously fixed to the arm 581 by means other than the magnet stand 17.

The link mechanism 58 in the boiler 40 is configured such that the arm 581 and the damper plate 55 have an identical rotation angle. The opening degree of the damper 54 can be obtained directly by measuring the rotation angle of the arm 581.

The load analyzer 20 stores a relational expression between an opening degree of the damper 54 and a combustion amount of the boiler 40, so that the combustion amount of the boiler 40 can be calculated from a measurement value of the tilt sensor 15. The boiler 40 according to the present embodiment is of the proportional control type so that the opening degree of the damper 54 corresponds to the combustion amount of the boiler 40.

Specifically, the combustion amount of the boiler 40 is 0% when the angle of the damper plate 55 is 0 degrees and the opening degree of the damper 54 is 0%. The combustion amount of the boiler 40 is 50% when the angle of the damper plate 55 is 45 degrees and the opening degree of the damper 54 is 50%. The combustion amount of the boiler 40 is 100% when the angle of the damper plate 55 is 90 degrees and the opening degree of the damper 54 is 100%.

In these manners, the boiler load analysis apparatus 10 according to the present embodiment can calculate a combustion amount of the boiler 40 including the tilt sensor 15, from a measurement value of the tilt sensor 15. A steam load or a steam flow generated by the boiler 40 can be obtained by measuring the combustion amount of the boiler 40 as well as fed water temperature in the feedwater line 65 and steam pressure in the steam extraction line 68.

Continuous measurement with the tilt sensor 15 achieves analysis of temporal variation in boiler steam load. An efficient boiler system can be established and optimized by checking and analyzing operation status of the boiler 40.

According to the present embodiment, the tilt sensor 15 is fixed to the member (the arm 581) configuring the damper 54 in the existing boiler 40 that includes no steam flowmeter and has difficulty in load analysis, and a rotation angle of the member is mechanically measured to directly obtain an opening degree of the damper 54 and accurately calculate a boiler load. The boiler load analysis apparatus according to the present embodiment thus has such a simple configuration and achieves highly accurate load analysis of the existing boiler.

The present embodiment is achieved only by providing the boiler to be analyzed with the tilt sensor 15 configured to mechanically detect a rotation angle. The sensor is commonly applicable to a boiler regardless of its capacity. The present embodiment will cause no shock hazard or the like, which may happen upon measurement of current on a power line of a conventional control panel. The existing boiler 40 can be thus safely retrofitted with the boiler load analysis apparatus 10.

The present embodiment can be modified variously within the range not departing from the gist of the present invention. The tilt sensor 15 can be fixed to the arm 581, or can be appropriately fixed to a different member configuring the damper 54. The member has only to be rotated in accordance with an opening degree of the damper 54 and allows detection of a rotation angle of the member for measurement of the opening angle of the damper 54.

The present embodiment exemplifies detection of an opening degree of the damper 54 serving as a supplied air flow regulating mechanism. The present invention can be achieved also by measuring an opening degree of the fuel control valve 47 serving as a fuel flow regulating mechanism. For example, a rotation angle of a rotary shaft or the like configuring the fuel control valve 47 can be measured in this case.

For measurement of the opening degree of the fuel control valve 47 serving as a fuel flow regulating mechanism, a boiler load can be calculated only from an opening degree of the fuel flow regulating mechanism instead of the opening degree of the supplied air flow regulating mechanism, or from the opening degrees of the supplied air flow regulating mechanism and the fuel flow regulating mechanism.

The tilt sensor 15 serving as an opening sensor configured to measure an opening degree of the damper 54 is adopted to measure a rotation angle of the arm 581 in the present embodiment. The present invention can alternatively adopt, as an opening sensor, a sensor of a different type, like an image recognition sensor including a camera.

Second Embodiment

The second embodiment of the present invention will be described next. A boiler load analysis apparatus 11 according to the present embodiment adopts a clamp current sensor 18 in place of the tilt sensor 15 according to the first embodiment, as an opening sensor configured to measure an opening degree of the damper 54. Other configurations, inclusive of the configuration of the boiler 40 as an installation target, are substantially the same as those of the boiler load analysis apparatus 10 according to the first embodiment. Accordingly, similar configurations are denoted by the same reference signs and will not be described repeatedly.

Figure 4:
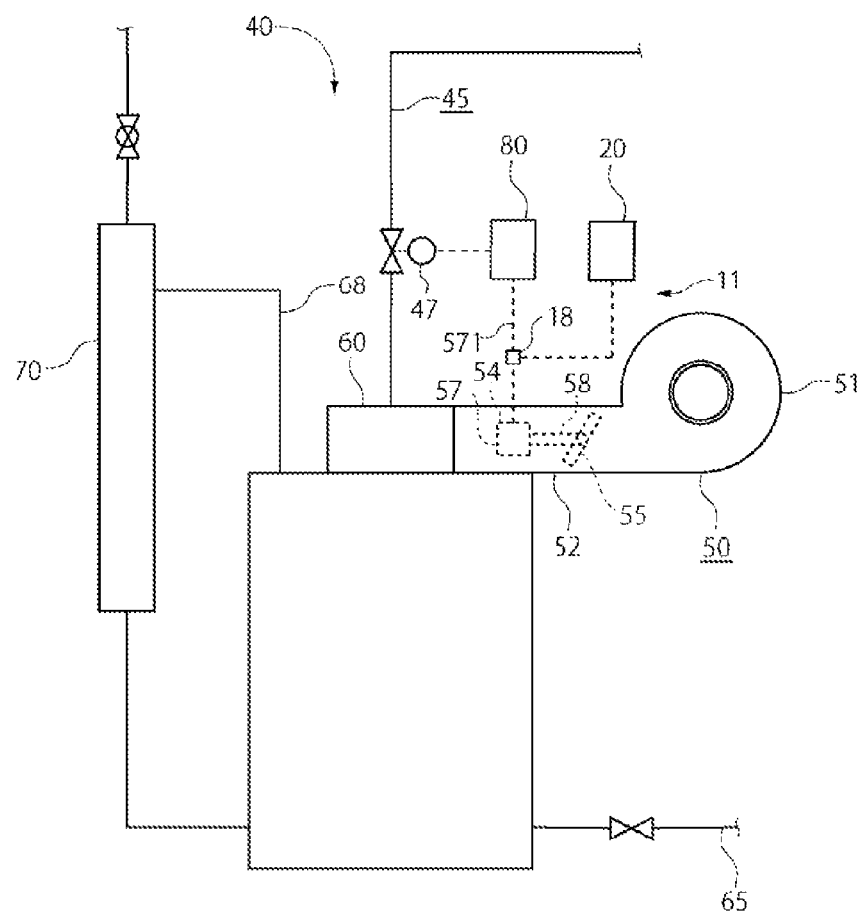
FIG. 4 is a pattern view schematically depicting a configuration of a boiler load analysis apparatus according to a second embodiment of the present invention.
Figure 5:
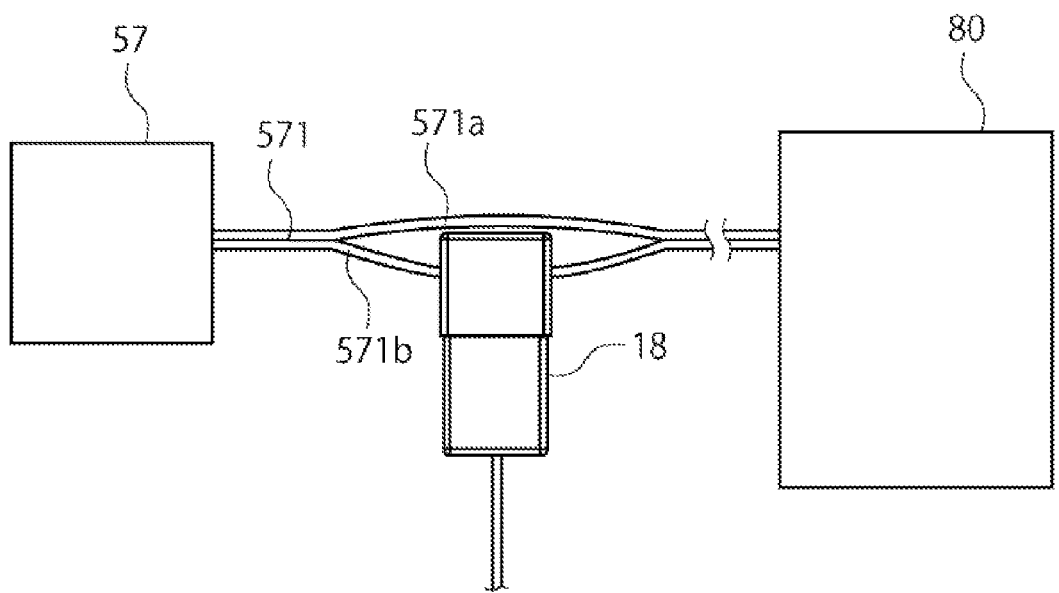
FIG. 5 is a pattern view schematically depicting an installation state of a clamp current sensor according to the second embodiment of the present invention.

FIG. 4 is a pattern view schematically depicting a configuration of the boiler load analysis apparatus 11 according to the second embodiment, in a state where the boiler load analysis apparatus 11 is installed in the existing boiler 40. FIG. 5 is a pattern view schematically depicting an installation state of the clamp current sensor 18 according to the second embodiment.

The boiler load analysis apparatus 11 includes the clamp current sensor 18 and the load analyzer 20 configured to calculate a steam load of the boiler 40 from output from the clamp current sensor 18 and analyze the calculated steam load. The existing boiler 40 is retrofitted with the boiler load analysis apparatus 11 also in the second embodiment for analysis of a steam load of the boiler 40.

In order to measure an opening degree of the damper 54 in the boiler 40, the clamp current sensor 18 is provided on a damper control signal electric cable 571 serving as a drive control signal line of the modutrol motor 57 serving as a drive motor of the damper 54.

The clamp current sensor 18 is configured to detect variation in magnetic field to contactlessly detect current flowing in an electric cable. The present embodiment adopts a direct current sensor for detection of DC current of 4 to 20 mA. The clamp current sensor 18 according to the present embodiment is provided to a single core electric cable for accurate measurement of a control signal.

The damper control signal electric cable 571 includes a positive line 571a and a negative line 571b. As depicted in FIG. 5, the clamp current sensor 18 can be provided only to the single core negative line 571b.

The modutrol motor 57 according to the present embodiment serves as a drive motor having a rotation angle controlled in accordance with an analog control signal such that the angle of the damper plate 55 is 0 degrees (the opening degree of the damper 54 is 0%) when the control signal has 4 mA, the angle of the damper plate 55 is 45 degrees (the opening degree of the damper 54 is 50%) when the control signal has 12 mA, the angle of the damper plate 55 is 90 degrees (the opening degree of the damper 54 is 100%) when the control signal has 20 mA, and the like.

In other words, the clamp current sensor 18 measures a current value of a control signal so as to measure an opening degree of the damper 54. As described earlier, the opening degree of the damper corresponds to the combustion amount of the boiler 40 in the boiler 40.

According to these relations, the load analyzer 20 stores a relational expression between a measurement value of the clamp current sensor 18 and a boiler combustion amount (e.g. boiler combustion amount=100*(measurement value−4)/20). The load analyzer 20 can thus calculate a combustion amount of the boiler 40 from a measurement value of the clamp current sensor 18, and can further obtain a steam load or a steam flow generated by the boiler 40 by measuring fed water temperature in the feedwater line 65 and steam pressure in the steam extraction line 68.

An opening degree of the damper 54 is indirectly detected by measuring a control signal of the modutrol motor 57 in the present embodiment. Measurement of an opening degree in this application is assumed to include such indirect measurement of an opening degree in the present description.

The second embodiment has been described so far. The present embodiment achieves a functional effect similar to that of the first embodiment, specifically, highly accurate load analysis of the existing boiler in the simple configuration. Furthermore, if the damper control signal electric cable 571 of the modutrol motor 57 is easily accessible, the boiler load analysis apparatus 11 can be additionally provided by simply providing the electric cable with the clamp current sensor 18.

An instrumentation signal of the modutrol motor 57 configured to regulate an opening degree of the damper 54 basically has no large variation according to capacity and the type of the boiler 40. An identical sensor is thus generally applicable as the clamp current sensor 18 as in the present embodiment.

The present embodiment can be also modified variously within the range not departing from the gist of the present invention. For example, the clamp current sensor 18 can be provided on the damper control signal electric cable 571, or can be appropriately provided on a different drive control signal line if an opening degree of the damper 54 can be measured indirectly by measuring a control signal.

Specifically, the clamp current sensor 18 can be provided on a control signal electric cable of the fuel control valve 47 serving as a fuel flow regulating mechanism to measure a current value of a control signal of the fuel control valve 47. In this case, a boiler load can be calculated only from a measurement value of a control signal of the fuel flow regulating mechanism instead of a control signal of the supplied air flow regulating mechanism, or from measurement values of control signals of the supplied air flow regulating mechanism and the fuel flow regulating mechanism.

The modutrol motor 57 according to the present embodiment is the drive motor controlled to rotate in accordance with an analog control signal. Alternatively, the modutrol motor 57 can be a drive motor controlled to drive in accordance with a pulse signal. In this case, a pulse detection sensor can be adopted as the clamp current sensor 18 to obtain an angle of the damper plate 55 from a pulse number measured by the sensor.

A pulse drive motor is provided with four electric cables, namely, positive and negative lines of a pulse signal electric cable for forward rotation and positive and negative lines of a pulse signal electric cable for reverse rotation. The clamp current sensor 18 is provided on each of the pulse signal electric cable for positive rotation and the pulse signal electric cable for negative rotation. The clamp current sensors 18 are each provided on the single core electric cable of one of the positive and negative lines.

The first and second embodiments have been described, in which the boiler load analysis apparatus according to the present invention is applied to a boiler of the proportional control type. The present invention is obviously applicable to a boiler having multiple combustion stages including a low combustion stage and a high combustion stage.

DESCRIPTION OF REFERENCE SIGNS 10,11 Boiler load analysis apparatus
15 Tilt sensor
18 Clamp current sensor
20 Load analyzer
40 Boiler
45 Fuel supply line
47 Fuel control valve
471 Fuel control signal electric cable 50 Combustion air supply line
54 Damper
55 Damper plate
551 Damper shaft
57 Modutrol motor
571 Damper control signal electric cable
58 Link mechanism
581 Arm
60 Burner
65 Feedwater line
68 Steam extraction line
70 Steam-water separator
80 Controller

The invention claimed is:

1. A boiler load analysis apparatus configured to analyze a steam load of a boiler, the apparatus comprising:
an opening sensor provided to at least one of a fuel supply line and a combustion air supply line of the boiler and configured to measure an opening degree of at least one of a fuel flow regulating mechanism configured to regulate, with the opening degree, a fuel flow in the fuel supply line and a supplied air flow regulating mechanism configured to regulate, with the opening degree, a supplied air flow in the combustion air supply line; and
a load analyzer configured to calculate the steam load of the boiler from a measurement value of the opening sensor,
wherein the opening sensor is disposed at a link mechanism of at least one of the fuel flow regulating mechanism and the supplied air flow regulating mechanism and configured to detect a rotation angle of the link mechanism.

2. The boiler load analysis apparatus according to claim 1, wherein the opening sensor is a tilt sensor fixed to the link mechanism.

3. The boiler load analysis apparatus according to claim 1, wherein the opening sensor is disposed at an arm of the link mechanism.

4. The boiler load analysis apparatus according to claim 1, wherein the boiler load analysis apparatus is configured not to be placed inside a duct of the boiler, but to be placed at the link mechanism from outside the boiler.

5. A boiler load analysis apparatus configured to analyze a steam load of a boiler, the apparatus comprising:
an opening sensor provided to at least one of a fuel supply line and a combustion air supply line of the boiler and configured to measure an opening degree of at least one of a fuel flow regulating mechanism configured to regulate, with the opening degree, a fuel flow in the fuel supply line and a supplied air flow regulating mechanism configured to regulate, with the opening degree, a supplied air flow in the combustion air supply line; and
a load analyzer configured to calculate the steam load of the boiler from a measurement value of the opening sensor,
wherein the opening sensor is a clamp current sensor attached to a control signal electric cable of a drive motor of at least one of the fuel flow regulating mechanism and the supplied air flow regulating mechanism.

* * * * *